Figure 19:
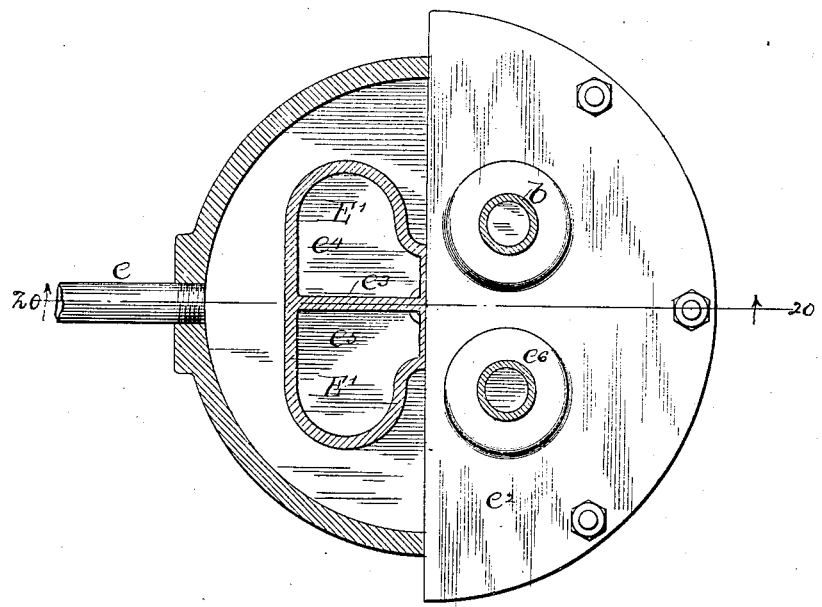

No. 792,283. PATENTED JUNE 13, 1905.
E. F. OSBORNE.
STEAM HEATING APPARATUS.
APPLICATION FILED AUG. 18, 1898.
9 SHEETS—SHEET 1.
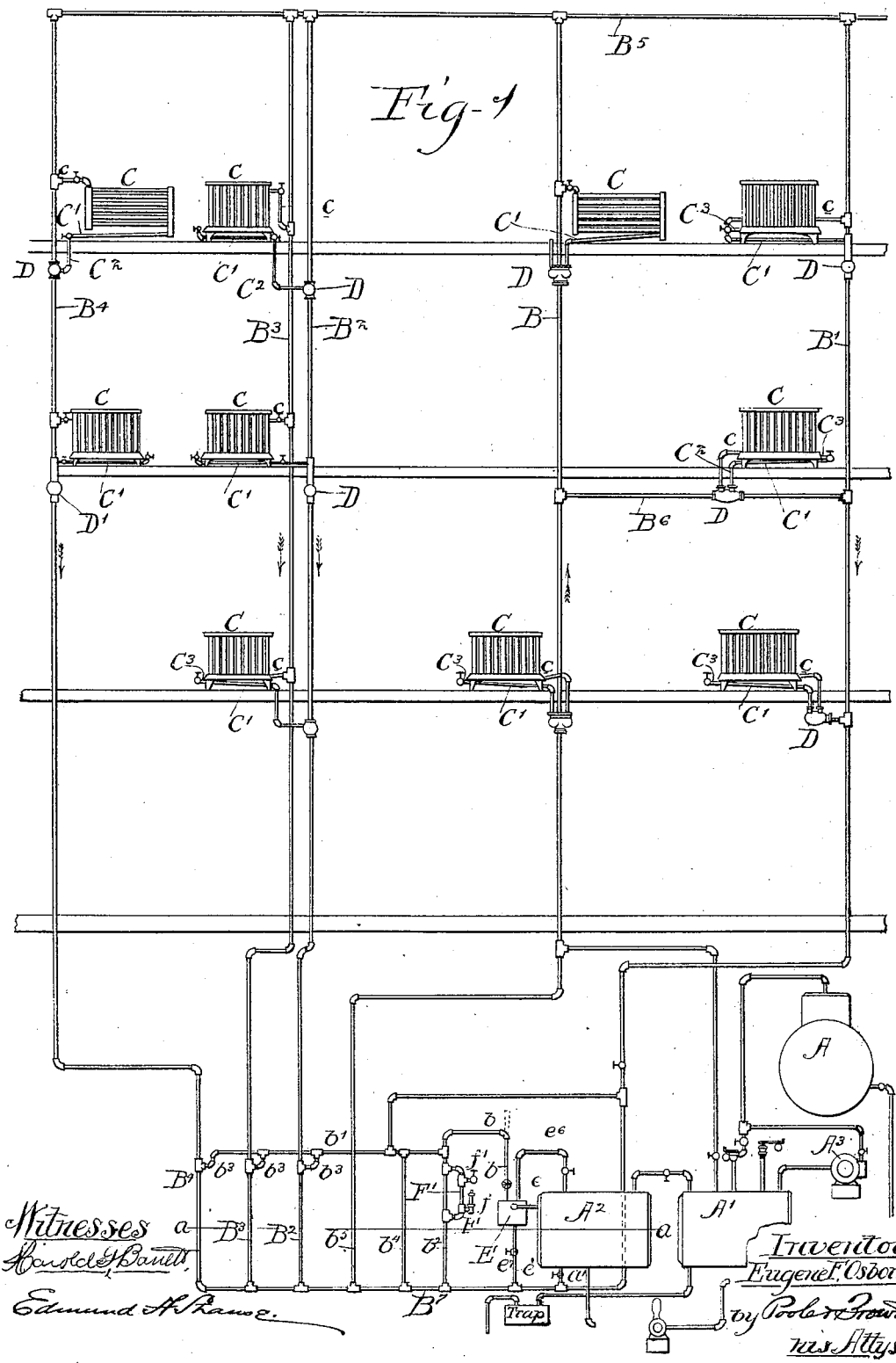

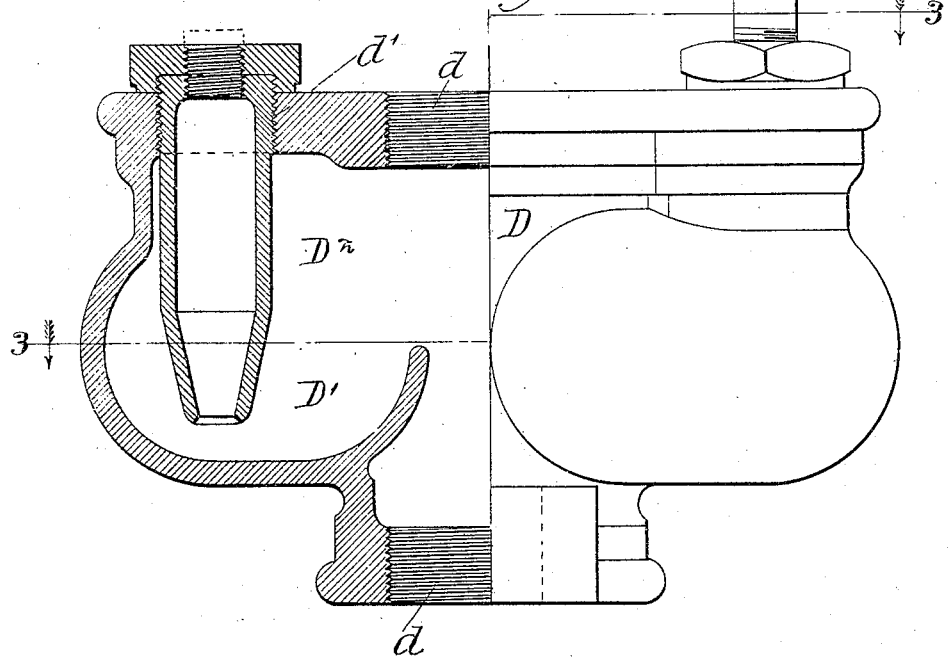
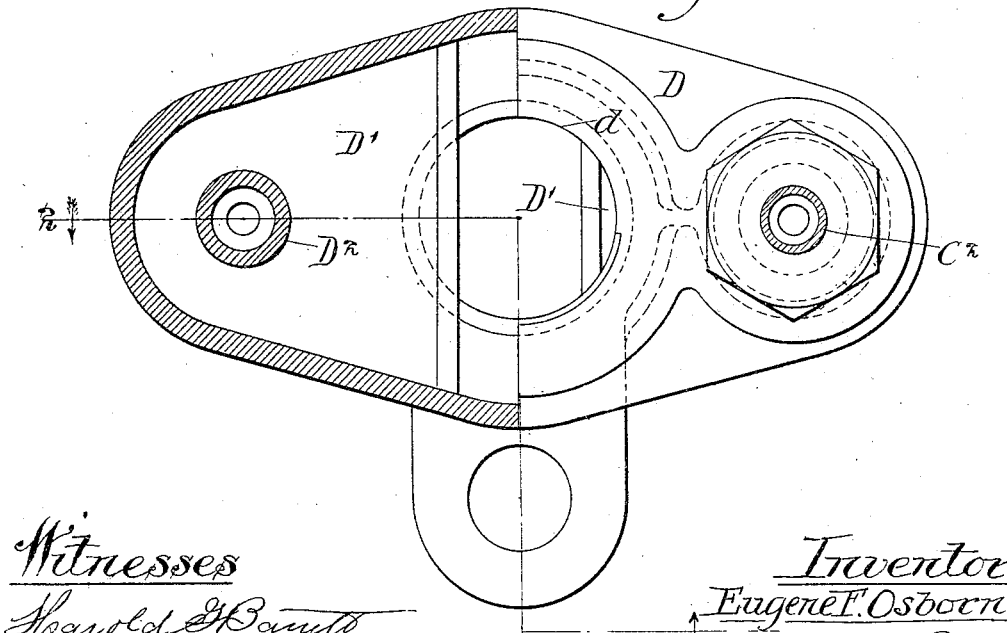

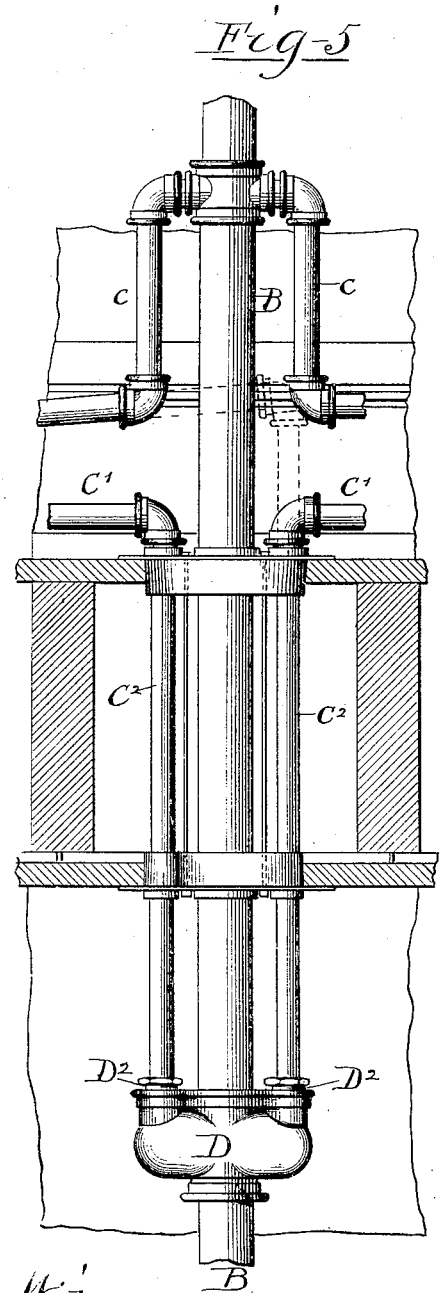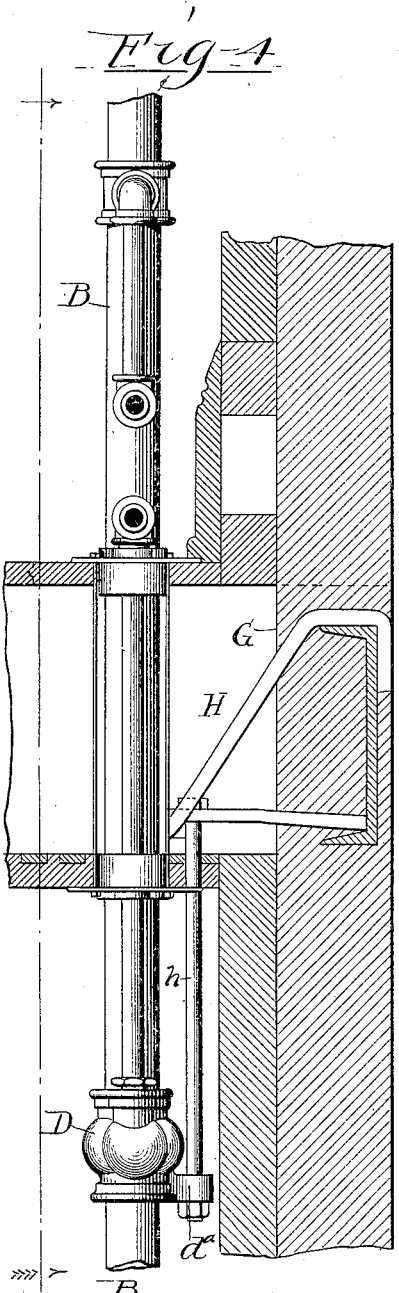

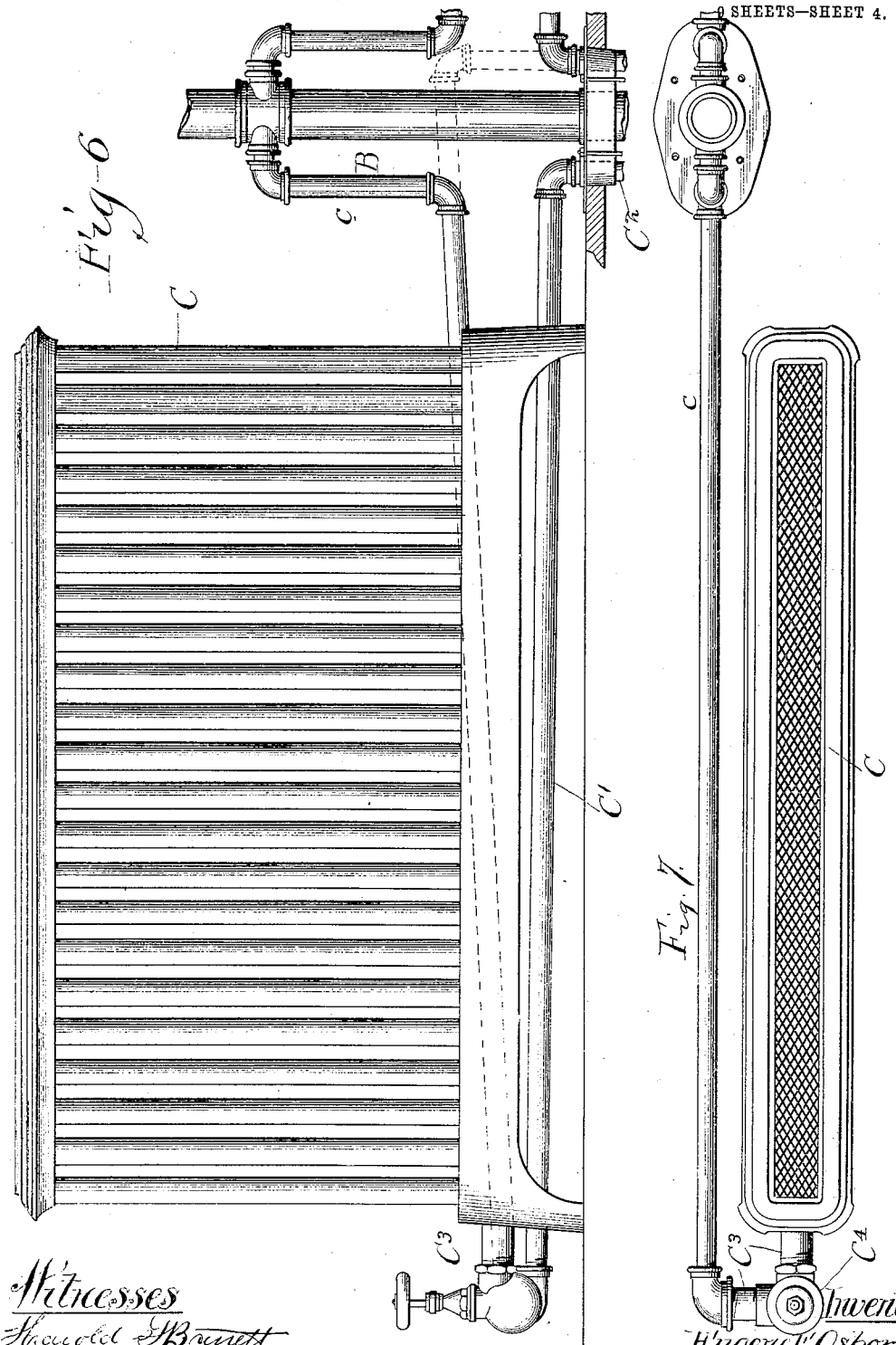

No. 792,283. PATENTED JUNE 13, 1905.
E. F. OSBORNE.
STEAM HEATING APPARATUS.
APPLICATION FILED AUG. 18, 1898.
9 SHEETS—SHEET 5.
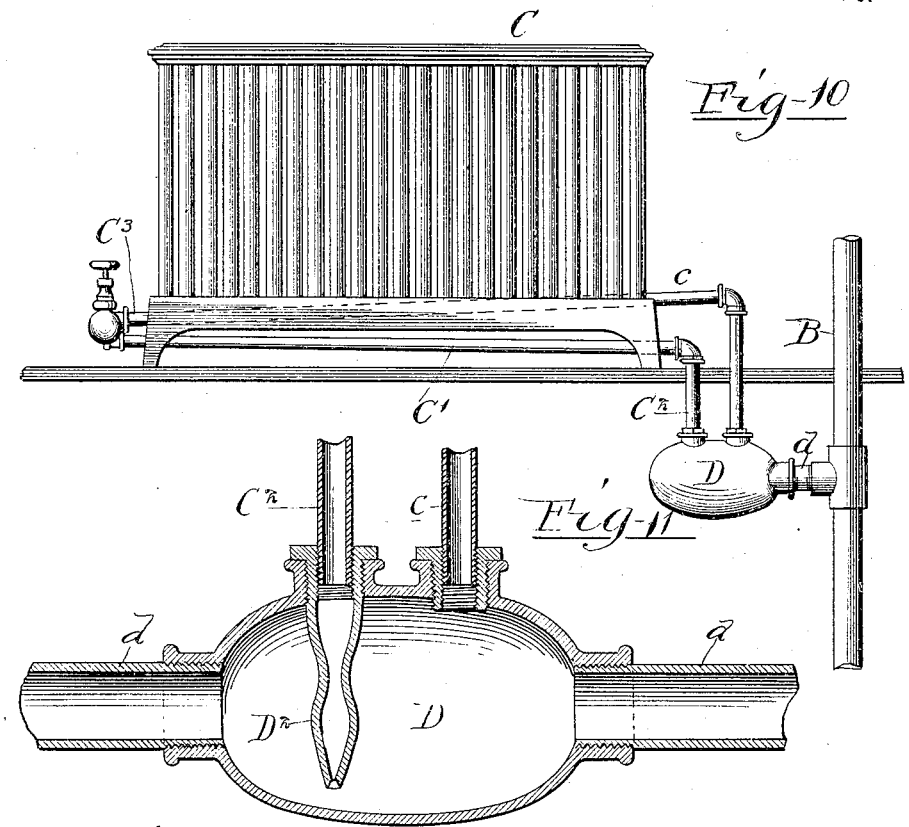
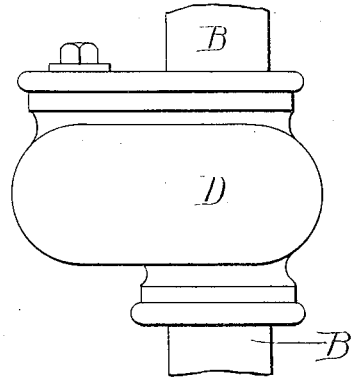
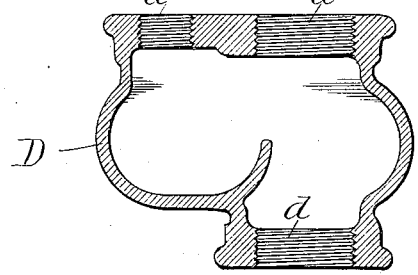

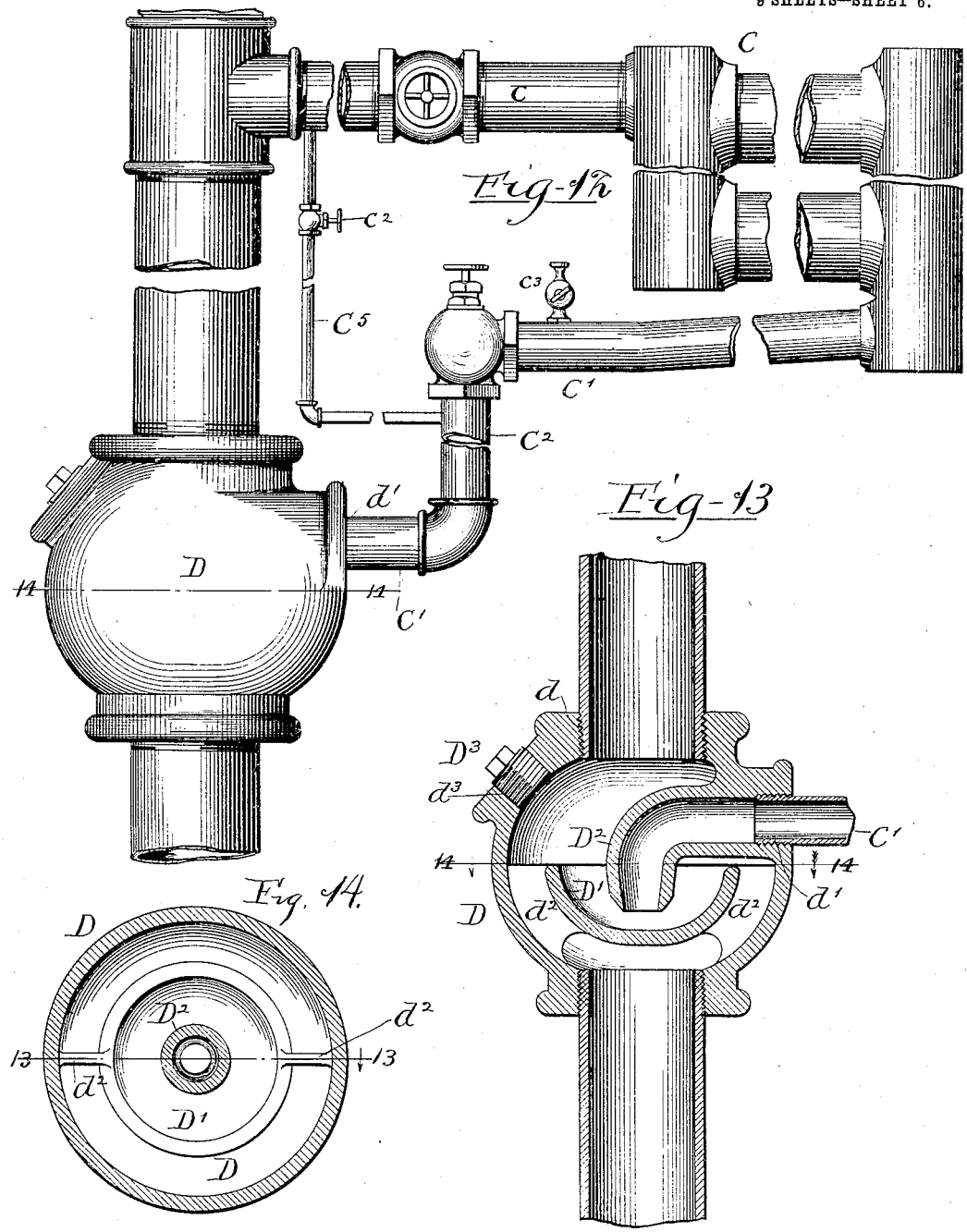

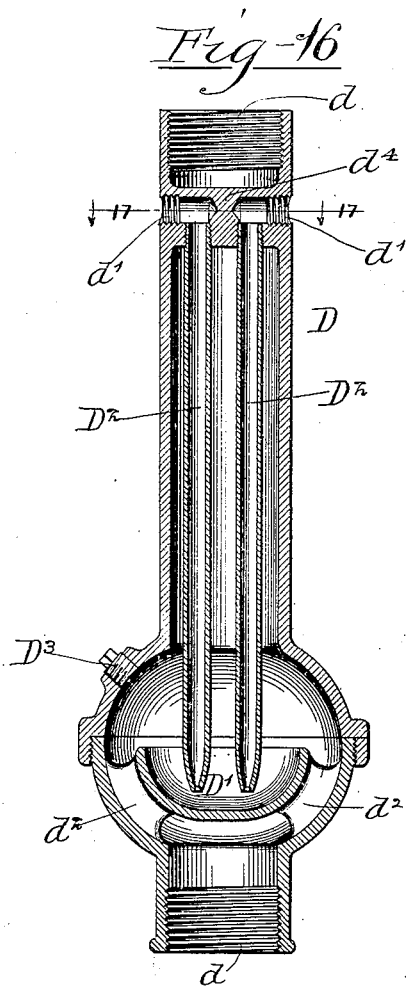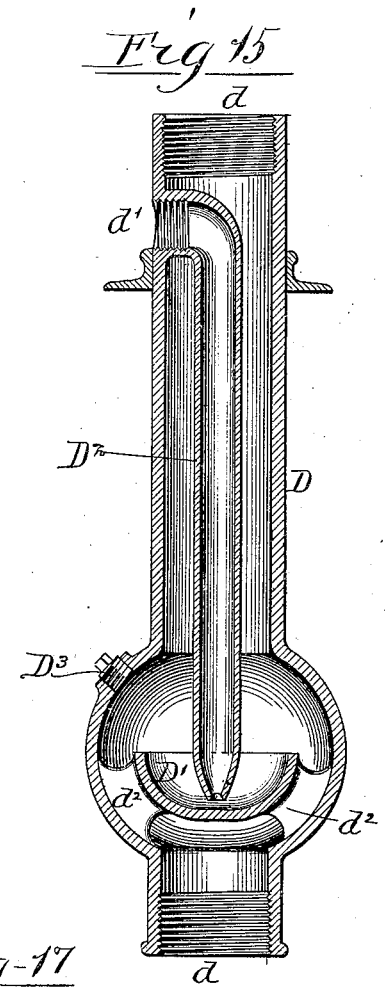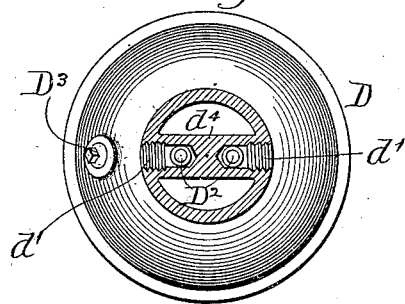

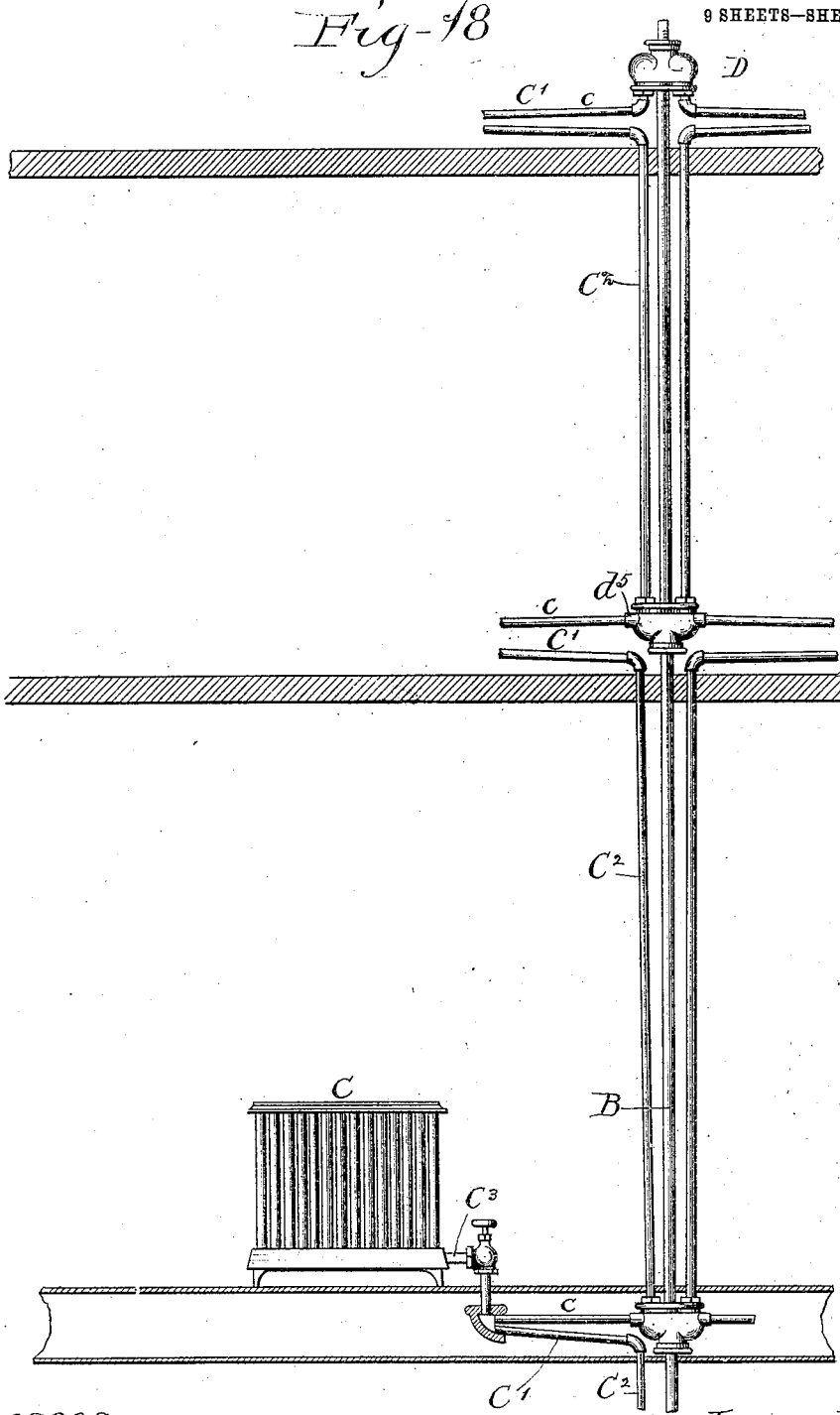

No. 792,283. PATENTED JUNE 13, 1905.
E. F. OSBORNE.
STEAM HEATING APPARATUS.
APPLICATION FILED AUG. 18, 1898.

9 SHEETS—SHEET 9.

Witnesses
Harold G. Bartlett
Edmund A. Krause

Inventor
Eugene F. Osborne
by Poole & Brown
his Attys

No. 792,283.                                              Patented June 13, 1905.

UNITED STATES PATENT OFFICE.

EUGENE F. OSBORNE, OF CHICAGO, ILLINOIS, ASSIGNOR TO OSBORNE STEAM ENGINEERING COMPANY, OF CHICAGO, ILLINOIS, A CORPORATION OF ILLINOIS.

STEAM-HEATING APPARATUS.

SPECIFICATION forming part of Letters Patent No. 792,283, dated June 13, 1905.

Application filed August 18, 1898. Serial No. 688,903.

*To all whom it may concern:*

Be it known that I, EUGENE F. OSBORNE, of Chicago, in the county of Cook and State of Illinois, have invented certain new and useful Improvements in Steam-Heating Apparatus; and I do hereby declare that the following is a full, clear, and exact description thereof, reference being had to the accompanying drawings, and to the letters of reference marked thereon, which form a part of this specification.

This invention relates to circulating systems for the distribution of steam for heating purposes and for the gathering of the water of condensation which results from such distribution and application of steam.

The invention is more especially designed to meet the conditions and requirements of such systems when installed in modern high buildings; and the particular objects of the invention, as well as its essential characteristics, will be best understood after a brief presentation of some of the more important of such conditions and requirements.

First. The branch circulating-pipes in such buildings (usually vertical) are subject to wide variation in length, owing to the changes of temperature to which they are subject. While these circulating-pipes have a lengthwise movement resulting from such expansion and contraction, the radiators or other heating appliances connected with them are of necessity relatively stationary.

Second. In the construction of a steam-heating plant in a high building it is desirable to place the circulating-pipes in position (whether they be vertical or horizontal) before the building is completed and before the vertical positions of the floors are accurately determined, this being commonly done after taking into account errors in construction and unequal settlement of the walls. Since provision for radiator connections will be made in these pipes at the time of their introduction in place, a mode of connecting the stationary radiators and the circulating-pipes which will accommodate itself to this condition, as well as to the condition of expansion and contraction, is a practical necessity. It is also desirable to provide for a limited movement of the radiator in either a vertical or horizontal direction to allow the insertion or removal of carpets or for cleaning behind them.

Third. It is a requirement that the circulating-pipes shall be so constructed as to be ready for the subsequent connection of radiators therewith at all desired points, and the fittings connected in or with the pipes for this purpose must be such as to remain intact under all conditions of temperature to which they may be subjected.

Fourth. Assuming that radiators have been connected with such circulating-pipes, it is a further condition that upon opening the valve or valves leading to and from the radiator steam shall fill or circulate through the radiator and the water of condensation formed or present in the radiator shall be conducted therefrom.

Fifth. It is desirable that there shall be no reversal of the steam and water currents in a radiator and that no steam shall enter the radiator and the connecting-pipes thereof except that which is to be condensed in such radiator and pipes. It is also desirable that means be provided by which the water of condensation may be delivered by its gravity from the radiator and its connecting pipe or pipes into a pipe under some degree of steam-pressure (whether it be the steam-distributing pipe or some other pipe of the system) without the passage of steam with the water.

Sixth. It is a condition of modern high buildings that a large amount of steam-power is expended in running elevators, electric lights, and other machinery, and that from the steam used in developing such power a large quantity of exhaust-steam is produced, which is or may be utilized in the heating apparatus. This exhaust-steam contains more or less of impurities, especially oil, which it is desirable to eliminate before the steam passes into the heating system.

Seventh. It is a frequent requirement in steam-heating plants for single large or several connected buildings that there be a number of divisions of the heating apparatus, which may be operated independently of each other, and that the water of condensation from all these divisions be conducted to a common reservoir, whence it may be reconveyed by a pump or other means to the boilers. The pressure of the several divisions will in practice vary to a considerable extent and their relative pressures may be instantly reversed, that which was higher than another becoming suddenly lower, and vice versa, while the return-pipe of each division must be in communication with the water-space of the said reservoir the steam-space of the reservoir must always be in communication with at least one of the divisions of the system at a point above the highest water-line of said division or otherwise made subject to a pressure nearly equal to that of the division with the steam-space of which it connects. It is a condition of such a system or plant that the water of condensation as it is received from each of the divisions has a temperature due to its pressure, which temperature is the same as that of the steam from which it was condensed, and it is a requirement that in order to pump this water it must be kept subject to very nearly the highest pressure carried upon any of the divisions delivering into the reservoir.

Eighth. It is a necessity to a successful apparatus that provision be made for the discharge of air therefrom.

The invention in its more direct relation to the first five of the above-enumerated conditions and requirements embraces as a primary feature the combination, with each of several relatively small sections, of the heating appliances of the system—as, for example, with each radiator or small number of radiators, as two or three—of an individual water seal so connected in the system as to receive the water of condensation from only such limited part of the working devices and to deliver the same into a steam-space of the system. This branch of the invention also embraces a water-seal fitting for connecting the discharge-pipe of a radiator or small number of radiating appliances with the circulating system, which fitting, though variable in form, contains provision for affording the water seal above referred to.

With respect to the sixth condition and requirement above stated, the devices herein illustrated contain nothing new, a reservoir such as is herein shown at A' for the reception of the exhaust-steam and the deposition of the impurities before distribution of the steam to the working appliances being old.

With reference to the seventh statement of conditions and requirements above given, the invention embraces what I term an "automatic division-seal" or "steam-check." This is a device adapted to allow the flow or passage of steam from one of the divisions operating under a higher pressure than another into the upper part of the reservoir, which receives the water of condensation, while it prevents the passage of steam either from the division carrying the higher pressure or from the reservoir into the division operating under a lower pressure. The device referred to is self-adjusting to the reversal of relative pressures to which the several divisions of such a system are subject in practice.

With respect to the eighth statement of conditions and requirements above given, the invention embraces a construction whereby the air is discharged from an entire system or an entire division of the system at a single point instead of at the foot of each vertical line or branch pipe, as heretofore practiced. Under this head and with a view to the attainment of the additional result of equalizing the steam-pressure throughout the several branches of a system or division the air-discharging devices are coupled with a device for producing such equalization of pressure. It may also be coupled with a provision for equalizing pressure between a division of a system and the reservoir which receives the water of condensation from the system. Both these last-mentioned matters will be hereinafter more fully explained.

Figure 20:
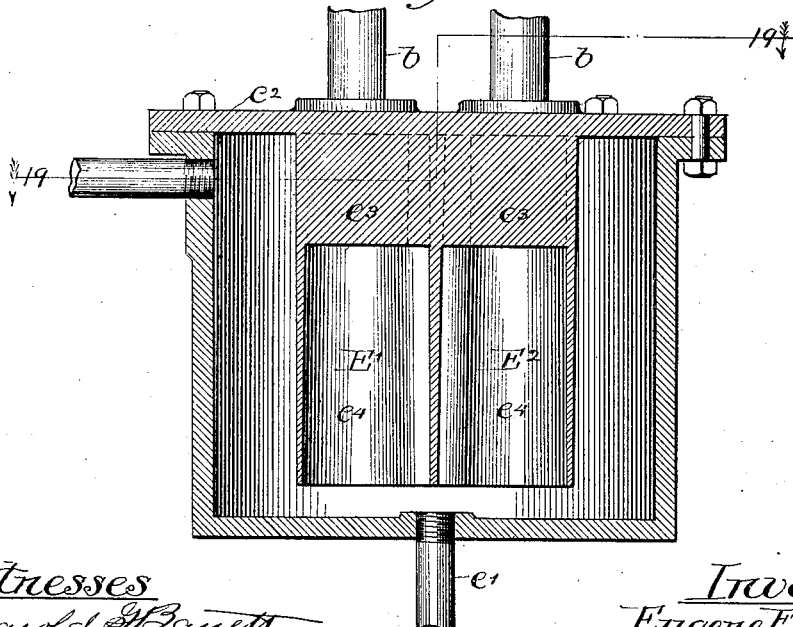

Describing the improvements as illustrated in the accompanying drawings, Figure 1 is a diagrammatic view of a steam-heating plant containing my several improvements. Fig. 2 is a side elevation, in partial vertical section, of one of the most approved forms of the seal-fitting which I have devised for connecting a vertical distributing-pipe with a radiator or small group of radiators, the section being taken on the line 2 2 of Fig. 3. Fig. 3 is a top view, in partial horizontal section, of the same fitting, the section being taken on the line 3 3 of Fig. 2. Fig. 4 illustrates the fitting shown in Figs. 2 and 3 connected with a vertical distributing-pipe of a heating system, and said figure also shows parts of the pipes which connect adjacent radiators with the fitting. This view is taken in the plane of the radiator connections, and it also shows means for supporting a vertical distributing-pipe from a single point in the building-wall, giving to said vertical pipe a single fixed point, which will commonly be about in the middle of its height. Fig. 5 is a view of the same fitting and pipes that are shown in Fig. 4, but in a plane at right angles to that of the radiator connections. Fig. 6 is a side elevation of a radiator, a fragment of a vertical distributing-pipe with which the radiator is connected, and the portions of the radiator-connecting pipes, which are broken away in Figs. 4 and 5. Fig. 7 is a top view of the radiator shown in Fig. 6, a horizontal section of the vertical distributing-pipe, and a plan view of the connections of the vertical pipe with the radiator. Fig. 8 illustrates an approved form of the fitting for connection with a single radiator, the same being shown in side elevation and connected in the vertical distributing-pipe. Fig. 9 is a central vertical section of the fitting shown in Fig. 8. Fig. 10 illustrates, in side elevation, a radiator provided with another form of the fitting adapted for connecting a single radiator with a horizontal pipe entering one end of said fitting. Fig. 11 shows essentially the same form of the fitting that is illustrated in Fig. 10, but adapted at each end for connection with a horizontal pipe. Figs. 12, 13, and 14 are views of another practical construction of the single fitting adapted for connection in vertical pipes, Fig. 12 showing it in side elevation connected in the vertical distributing-pipe, Fig. 13 being a central vertical section and Fig. 14 being a horizontal section. Figs. 15, 16, and 17 are sectional views of still other practical forms of the fitting adapted for connection in a vertical pipe of the circulating system. Fig. 15 is a central vertical section of the fitting having a connection for a single radiator. Fig. 16 is a similar section of the fitting having connections for two radiators, and Fig. 17 is a horizontal section on line 17 17 of Fig. 16 looking downward. Fig. 18 illustrates that form of the fitting which is shown upon a large scale in Figs. 2 to 5, inclusive, said fitting in this Fig. 18 being applied to use as a supply connection and also as a supply and receiving connection with a vertical circulating-pipe, whereby the number and variety of fitting needful to complete the connections with radiators on several floors is lessened. Fig. 19 is a partial plan and partial horizontal section of the division-seal, the section being taken on the line 19 19 of Fig. 20. Fig. 20 is a vertical section of said division-seal, the section being taken on the line 20 20 of Fig. 19.

Briefly explaining the principal features shown in Fig. 1, A designates a boiler; A', an expansion or steam-distributing tank; A², a tank-reservoir for the reception of water of condensation, and A³ a pump. B designates a rising pipe, B', B², B³, and B⁴ descending pipes, (using the terms "rising" and "descending" with reference to the direction of movement of their steam contents,) and B⁵ and B⁶ horizontal pipes, of a circulatory steam-heating system. C C are radiators, of which c c are the several steam-supply pipes and C' or C' C² the discharge-pipes. D D are various forms of the novel seal fitting, hereinbefore referred to as affording a water seal in each of the discharge or delivery passages leading from the several radiators C. E is the automatic steam-check, connected with the return-pipes of two or more divisions of a plant, and F is an air-valve serving to discharge the air from the entire circulatory system or from an entire division of a system.

The seal-fitting D is a chambered casting, and, as shown in nearly all figures of the drawings, it is provided with two opposite threaded openings $d$ $d$ for connection in a pipe of the circulating system. Describing the figures which illustrate this fitting in their order, Figs. 2 and 3 show the same as designed for connection in a vertical pipe of the circulating system. It is laterally extended on opposite sides of the line of the openings $d$ $d$, each lateral extension containing a chamber, the bottom of which forms a cup D', adapted to hold a small body of water. From its having two cups, as shown in these figures, it may be called a "duplex" fitting as distinguished from the single form to be hereinafter described. Into each of the cups D' depends the open end of the water-discharge pipe of a radiator. The terminal portion of this discharge-pipe within the fitting is lettered D², and it is shown and preferably made as a short separate tube, screw-threaded through on opening $d'$ in the upper wall of the fitting and interiorly threaded at its upper end to receive the vertical part C² of the water-discharge connecting-pipe C' of the radiator. Between the adjacent edges of the cups D' is a passage continuous with the openings $d$ $d$, so that steam and water may pass through the fitting. As a special feature of improvement the edges of the cups may project into the line of said passages or the cups may be otherwise brought into the course of water-flow through the pipe in order that water passing along the pipe may enter into them. This construction and arrangement of the parts insures that the cup B' shall always be sufficiently filled to prevent steam passing from the fitting upwardly into an associated radiator through its water-discharge pipe. This duplex form of fitting is intended more particularly for those situations in which it is desired to make provision for the connection of two radiators with the same circulating-pipe at or near the same level—as, for example, where the pipe stands near a vertical line of partitions and the radiators to be connected therewith are located in rooms separated by such partitions. The fitting will be connected in the circulating-pipe when the latter is put in place, and if one or both the radiators are to be temporarily omitted or left unconnected the corresponding tube D² will also be left out till connection with the radiator is made and its place occupied meantime by a plug. (Shown by dotted lines in Fig. 2.) The position of the fitting D in a vertical circulating-pipe of the system will be preferably below the floor on which the radiator or radiators stand and near the subjacent ceiling, as shown in Figs. 4 and 5, where it will be at all times accessible.

As a safeguard against injury to the fitting from freezing of the water within the cup D' the latter is shown as flaring upwardly toward its open top, the tube D² is contracted toward its lower end from a point above the top of the cup, and the lower annular edge of the tube D² is sharpened or narrowed.

In Figs. 8 and 9 the fitting D is shown in one of its single forms and as adapted for connection in a vertical circulating-pipe, the same corresponding essentially with one side or half of the duplex form shown in Figs. 2, 3, 4, and 5.

Figs. 10 and 11 illustrate a form of the single water-seal fitting adapted for connection with a horizontal pipe of the circulating system or for connection with a vertical pipe of such a system by means of a horizontal connection, as shown in Fig. 10, said horizontal pipe being large enough for both the admission of steam and the discharge of water of condensation.

The fitting shown in Figs. 10 and 11 when intended for connection at both ends with a horizontal pipe of the circulating system will be provided with two oppositely-disposed and threaded branches $d$ $d$, as shown in Fig. 11; but when intended for connection with the end of a horizontal pipe it will have but a single branch $d$, as shown in Fig. 10.

In Figs. 12, 13, and 14 is shown a form of single fitting D adapted for connection in a vertical pipe of the circulating system and having a lateral inlet or opening for the discharge-pipe of the radiator. In this case the terminal D² of said radiator discharge-pipe is shown as being integral with the shell of the fitting and as curved within the fitting, so that its extremity is directed downwardly to a point near the bottom of the cup D′. In this instance the cup is shown as being in the line of the openings $d$ $d$ and also as being supported from the interior of the shell D by integral webs $d^2$, a sufficient space being allowed between the cup and the walls of the fitting to allow unobstructed passage of steam or steam and water past the cup. While the surging of water through the cup D′ is found in practice to keep the same clear of obstruction, the fitting may be provided with an opening $d^3$, (stopped by a removable plug D³,) through which opening the interior of the cup may be reached from the outside. In Fig. 12, which shows this form of the fitting connected with a radiator, a small by-pass pipe C⁵ connecting the radiator-pipes $c$ and C′ between the valves therein and the circulating-pipe with which said pipes $c$ and C′ connect. This arrangement is rendered desirable because the terminal D² is not removable and would therefore be liable to freeze if the radiator were not connected. This arrangement is also desirable in all cases in which a radiator has separate feed and return pipes, since when the valves are closed water would be liable to back up in the return-pipe and would also be liable to freeze. The by-pass pipe C⁵ prevents the backing up of water and also permits a circulation through the lower end D² of the radiator discharge-pipe, and thus prevents its contents from freezing. The by-pass is provided with a valve $c^2$, by which it may be closed, except in cold weather and when the radiator is cut off.

In Fig. 15 is shown a form of the single fitting D, similar to that of Figs. 12, 13, and 14, except that it is prolonged at its upper end, and the interior curved and depending terminal D² of the radiator discharge-pipe is correspondingly prolonged, giving the opening $d'$ location at a point near the top of the fitting. This form of fitting will usually be long enough to extend through the floor of a building, so that the opening $d'$ will be above the floor, while the bulb or shell of the fitting containing the cup D′ will be below the subjacent ceiling.

In Figs. 16 and 17 is shown the same form of fitting as that of Fig. 15, but of duplex form, the fitting being in this instance provided with opposite openings $d'$ for two radiator discharge-pipes and having a depending tube D² leading from each of these openings $d'$ into the cup D′. As a detail of construction this fitting of Figs. 16 and 17 is provided with a transverse bar or bridge $d^4$, cast integral with the neck of the fitting and bored from opposite sides to form the separate openings $d'$ and also tapped in its lower side to receive the separate tubes D². To give access to the neck of the fitting for the purpose of adapting the cross-bar to receive said tubes D², the bulb or shell of the fitting is made in two parts and fastened together as shown or in other suitable manner.

In Fig. 18 the seal-fitting D (shown in Figs. 2, 3, 4, and 5) is illustrated as taking the place of other forms of fittings. At the top of the line of circulating-pipe illustrated this seal-fitting is shown as taking the place of an ordinary cross-coupling for making the connection with the steam-supply pipes of adjacent radiators. For this purpose the seal-fitting is inverted, and in this instance the separate tube D² will be omitted. Farther down on the same circulating-pipe the fitting D is shown as affording connection for the steam-supply pipe of one radiator and the water-discharge pipe of another radiator upon a higher floor than that to which it supplies steam. In this use it connects with the steam-supply pipe of the radiator on the adjacent floor and with the discharge-pipe of the radiator on the floor above, which arrangement affords the necessary hydraulic head in the discharge-pipe. For this double use of the fitting the latter is provided with an additional tapped opening $d^5$ for each radiator supply-pipe, which pipe of course terminates within the steam-space of the fitting instead of extending into the cup D′. Such double use of the fitting saves the cost of a separate T or other form of branch fitting and also the cost of cutting and threading the circulating-pipe for jointure with such T or other fitting, besides giving a great height for the hydraulic head.

It will be observed that in all forms of the individual seals herein shown the horizontal area of the seal-fitting is much greater than that of the water-discharge pipe leading thereinto, so that I am enabled by the use of a relatively shallow fitting to provide sufficient water to constitute the proper seal between the water-discharge pipe and the space into which the water is discharged from said discharge-pipe.

The advantages of the individual seal above described relate both to the operation of the radiators and to the construction of the system. In respect to the former of these I point out that the seal insures in each radiator a positive and active circulation always in the right direction or from the proper steam-entrance to the proper water-discharge and that as a consequence the air is expelled from the radiator and hammering and pounding is avoided. This is because the seal establishes for each radiator (or small group of two or three radiators) with which it is connected a separate circuit of which said seal is the terminus, each circuit having its own peculiar pressure and loss of pressure and hydraulic head wholly independent of the pipe or pipes of the circulating system with which the radiators are connected, except as said pipe or pipes are sources of steam-supply or receptacles of water-discharge. The water seal in the cup D' of necessity prevents the inflow of steam by way of the radiator discharge-pipe and also the outflow of steam through said discharge-pipe, while permitting the free discharge of the water of condensation. As a constructive advantage of establishing such an independent circuit for each radiator (or group of two or three radiators) much smaller pipes may be used for the radiator connections and the radiators may be set at a greater distance from a circulating-pipe with a given fall between the radiator and said circulating-pipe. The use of the smaller pipes permitted as branch connections of the radiator allows the circulating-pipe with which the radiator is connected to have wide motion under changes of temperature, for the reason that the small connecting-pipes are so flexible as to readily spring or bend without peril to themselves or to their joints. This permits the longest circulation-pipe to be secured at a single point in its length and "expansion-joints" to be dispensed with. For the same reason the need of absolute accuracy in the location of a fitting for radiator connections is obviated, and the circulating-pipes may therefore be put into an incomplete building, with the fittings connected approximately therein and without subsequent change or disturbance after the final location of the floors. In Figs. 4 and 5 are shown what may be understood to be the central part of a long vertical circulating-pipe B, extending adjacent to a wall G. H designates a bracket of any suitable construction embedded in the wall G or, if not adjacent to such a wall, secured to the floor-joists or any permanent part of the building capable of safely supporting the entire pipe B, and from said bracket H the pipe B is supported through the medium of a rod $h$, which passes through a lug $d^a$ on the adjacent fitting D. No other support for this pipe is needed, and all elongation or shortening thereof from change of temperature is permitted by the free flexure of the radiator-connecting pipes $c$ C'. As a further constructive advantage affecting the circulatory pipes of a system containing radiators having binary connections the employment of the individual seal described permits a new and more economical arrangement and proportionment of the branch piping, which results in a material reduction of cost of material and labor without impairment of efficiency. For example, the individual seal renders what is known as a "universal seal" unnecessary and dispenses with the special vertical return or outflow piping which has been used to connect the radiators severally with such universal seal. The size of the main piping may also in some cases be reduced considerably without loss of efficiency and with a material saving in its cost, particularly in high buildings. To state this last-mentioned matter otherwise and more generally, in a binary system the use of the independent seal described in connection with a given size of the return-pipe allows a desired circulation to be obtained by means of a less pressure of steam, or under the same or a higher pressure of steam such circulation may be obtained by means of smaller pipes. The choice is therefore open either to the use of smaller pipes for a given degree of efficiency or to attain greater efficiency to the use of the same size piping that would be employed in the older construction.

The individual seal being subject to opposing pressures of course involves two connections of each radiator with the circulating system. Both the steam-supply pipe and the water-delivery pipe of the radiator may, however, be connected with the radiator by a single pipe, as shown at the three lower and three right-hand radiators in Fig. 1 and as also shown in Figs. 6, 7, 10, and 18. Although the radiator in these cases is of itself a "single feed," the small size of the separate supply and discharge branches which connect the single-feed pipe of the radiator with the circulating system allows them to spring freely to permit a vertical movement of the main pipe or pipes with which they connect the radiator, and in this respect the structure presents a material advantage over the connection of a single-feed radiator as heretofore necessarily made, because in such previous construction the single-feed pipe has been necessarily large throughout its whole length and proportionately rigid or unyielding. Moreover, the single-feed radiator may in the construction herein set forth be connected with two separate circulatory pipes, one for the supply of steam and the other for the return of water of condensation, which construction is shown at the lower left-hand radiator of Fig. 1ª.

While a common steam and water circulating pipe (as B, B', or B⁴, Fig. 1) may be used with either a single-feed radiator or with a radiator having binary connections, a binary main system or one having separate steam and water pipes (as B² B³, Fig. 1) is preferably employed in many situations. To give the desired steam-pressure on both sides of the water seal, these pipes B² B³ must be connected with each other or with a common source of steam-supply. Separate steam and water pipes so connected with each other have been heretofore used, but not in combination with radiators having individual seals, as hereinbefore set forth. In such former construction the steam is free to enter the discharge-pipe of the radiator as well as its proper feed-pipe and to thereby prevent or impede the escape of air or water from the radiator. An air-cock C³ being provided in the discharge-pipe C', the employment of the individual seal with a binarily-connected radiator manifestly compels the expulsion of the air and insures a positive circulation of steam through the radiator in the right direction in the same manner that such circulation has been heretofore secured by a separate discharge-pipe leading from the radiator to the bottom of the system and below the water-line of a universal seal.

Aside from the general advantages of an individual seal as above set forth, the particular constructions shown of such a seal have several advantages over others which may be employed within the scope of my general invention. The first of these is that the seal is located within a circulating pipe or branch through which there is a flow of steam and is in the line of such flow. As a result the seal is not subject to freezing, or if frozen, by reason of closing off the entire line, the seal will be promptly thawed out upon admission of steam to the line, and no delay in the operation of the radiator or injury of any kind will be suffered in consequence of such freezing. If an ordinary U-seal were employed in the discharge-pipe of the radiator, such U being external to the main or branch main, it would manifestly be less readily thawed, and, moreover, if ruptured by reason of such freezing its discharge might do serious damage.

Next describing my invention as related to the divisional feature of an extended plant, I first direct attention to the connection of two or more divisions with a common reservoir for the reception of the water of condensation through the medium of the "division-check" hereinbefore referred to. This division-check is separately illustrated in its interior construction in Figs. 19 and 20 and is shown connected in a system at E in Fig. 1.

Referring to Figs. 19 and 20, the division-check E is shown as a closed vessel or casing provided with a side outlet $e$, near the top thereof, and a bottom drain-pipe $e'$, containing a valve $e^7$. (Shown only in Fig. 1.) From the top plate $e^2$ of the vessel or division-check E depend two open-bottomed cups or chambers E' E², reaching nearly to the bottom of the vessel E and having communication with the interior of said vessel only through their bottom openings. Each of said cups E' and E² is provided with a partial transverse partition $e^3$, also depending from the top plate $e^2$ and extending downward to about an inch and a half or other proper distance below the bottom of the outlet $e$, so as to form a water seal of about an inch and a half or other suitable depth. The two parts of each of the cups E' and E² separated by this partial partition $e^3$ are designated in the drawings by the letters $e^4$ $e^5$. Into each of the compartments $e^4$ and through the top plate $e^2$ leads a pipe $b$, which communicates with the steam-space of the several circulating-pipes of a division of the system, or, in other words, which communicates with said pipes above the highest water-line $a$ $a$ therein. From each of the other compartments, $e^5$, of said cups E' and E² and also through the top plate $e^2$ leads a steam-pipe $e^6$, which discharges into the upper part of the reservoir A². The outflow-pipe $e$ of the vessel E also connects with the steam-space of the reservoir A². There may be as many of these cups E' E² in a single vessel E as there are divisions in the system, or a vessel with a single cup, or, in other words, a single and complete division-check, may be employed for each division of the system. In the present case it may be supposed that the division-check E of Fig. 1 is provided with two cups E' and E² and that behind the pipe $b$ of Fig. 1 a second similar pipe (indicated in dotted lines) may enter the farther cup of said division-check from another division of the system. (Not shown.)

The operation of the division-check will be as follows: Assume that the valve $e^7$ in the drain-pipe $e'$ has been closed, and that steam has been turned on to both divisions of the system, and also that the vessel E has been filled with water to the level of its discharge-pipe $e$. The reservoir $a^2$ is also to be supposed to contain water delivered thereto from the several returns through the pipe $a'$ and that the water stands, say, at a level indicated by the dotted lines $a$ $a$ both in said reservoir and in said return-pipes. Said reservoir A² is further supposed to contain steam above the water therein, and it is to be understood that said steam is to be supplied from one or both of the divisions of the system through the division-check E and the steam connections $e^6$, steam being introduced thereto at a pressure to prevent boiling of the water in the reservoir $A^2$. While both divisions of the circulating system derive their steam from a common source, and therefore at their admission ends are subject to a common pressure, it is to be understood that their terminal pressures will be unequal and variable, owing to the unequal loads upon the several divisions, absolute or relative to the sizes and extent of the pipes in said several divisions. In practice while one or the other of two divisions delivering into the division-check E will commonly have a terminal pressure lower than that in the reservoir $A^2$ one or the other of said divisions will practically always have a terminal pressure higher than that of said reservoir. The terminal pressure in two or more divisions, however, are constantly changing and that which at one moment is higher than the other or higher than that of the reservoir may at the next moment be lower. When the terminal pressure of a division is higher than that of the reservoir by an amount exceeding, in this instance, a water-head of one and a half inches, the steam entering the chamber $e^4$ through the pipe $b$ depresses the water in said chamber until the steam may pass beneath the partial partition $e^3$ and into the adjacent chamber $e^5$. In entering this chamber $e^5$ the steam passes upwardly through the water therein and freely out through the pipe $e^6$ into the reservoir $A^2$. It will thus continue to deliver steam into the reservoir $A^2$ so long as the terminal pressure in that division continues to exceed the pressure in the reservoir by enough to overcome the water-head, in this instance of an inch and a half, which opposes its passage beneath the partial partition $e^3$. When the terminal pressure of a division falls below this relative degree, the water from the vessel E proportionately backs up into the chamber $e^4$ and possibly into the pipe $b$.

By the construction described each division communicates with the reservoir $A^2$ for the delivery of water of condensation into it through the common pipe $A'$ and also communicates with said reservoir for delivering steam thereto through the pipes $e^6$. While thus all divisions have steam communication with the reservoir $A^2$, steam cannot pass from a division having a higher pressure into one having a lower pressure. As a consequence the circulation in each division will always be in the same direction and will proceed with regularity and certainty. The water of condensation maintains the chamber E filled to the level of the pipe $e$, so that the level of the water does not fall in said chamber sufficiently low to break the seal between the chambers $e^4$ $e^5$ of the device under the usual operating conditions of the system, the parts being of course constructed in proper proportions in relation to a predetermined pressure under which the system is to operate.

With respect to the discharge of air from an entire division having several drip or return pipes, ($b^4$ and B' $B^2$ $B^3$ $B^4$, Fig. 1,) $b'$ designates a horizontal pipe connecting all or several of said drip-pipes above the waterline $a$ $a$, and $b^2$ is a prolongation of $b'$, terminating in the lower horizontal or main return-pipe $B^7$. The pipe $b'$ is desirably connected with the vertical drips in such way as to prevent the induction of water from the latter to the former as far as possible, and the said pipe $b'$ is shown as elevated above its connection with the drips by short bent pipes $b^3$. In the descending prolongation $b^2$ of the pipe $b'$ the air-discharging mechanism F is placed. This mechanism consists, as shown, of a short vertical pipe F', communicating at both its upper and lower ends with the pipe $b^2$ and provided either with an automatic air-valve $f$ or with a hand-valve $f'$, or with both, as may be deemed desirable. The construction shown favors the delivery of air without water from all the drips to the air-pipe F', whence it may discharge or be discharged by one or the other of said valves. Only the drips of a single division will be connected by the pipe $b'$ and, as between these, the said horizontal pipe will advantageously act as a steam-feed and pressure-equalizer.

In a system not divided into separate divisions, or, in other words, containing only a single division, the pipe $b'$, which has the air valve or valves connected therewith, may connect directly with the steam-space of the reservoir $A^2$ instead of communicating with a division-seal, such a seal being of course not used except in systems having more than one division.

It will be understood that the invention is applicable to other heat-transmitting appliances than radiators, and it is desired that the radiator in the accompanying drawings and the term "radiator" herein employed may be understood to represent and stand for any other heat-transmitting device or apparatus.

I claim as my invention—

1. In a steam-heating and water-gathering system, a water-seal fitting consisting of an external shell or casing having through connections with a steam-supply pipe of the system and containing an open cavity to receive water of condensation, and provided also with a water-inlet orifice connected to a water-discharge pipe of the system; the orifice being at the extremity of an open pipe which is located within the interior of the cavity so as to be submerged in the water therein, and the cavity discharging its water into the steam-supply pipe and being of flaring form from bottom to top, to prevent rupture by freezing, substantially as set forth.

2. In a steam-circulating and water-gathering system, the combination with a steam-heating device, a steam-supply pipe leading thereto, and a water-discharge pipe leading therefrom, of a water-seal fitting connected to the discharge-pipe and also to the steam-supply pipe; said fitting having an internal open cavity to contain water of condensation, flared outwardly from bottom to top to prevent rupture by freezing, and discharging its water into the steam-supply pipe, and provided, furthermore, with an open water-inlet pipe communicating with the water-discharge pipe and having its extremity submerged in the water contained by the cavity, said seal-fitting also affording a water-column external to the heater for counterbalancing the difference of pressure between the interior of the heater and the interior of the steam-supply pipe, substantially as set forth.

3. The combination of a steam-supply pipe (as $B^3$) and a water-conducting pipe (as $B^2$) subject to steam-pressure, of a radiator having supply and discharge connection with said pipes respectively, and a water-seal fitting (as D) consisting of an external shell or casing connected to the discharge-pipe and also having through connection with the supply-pipe; said fitting having an internal open cavity, for water, flared from bottom to top to prevent rupture by freezing, and discharging its water into the steam-supply pipe and provided also with an open water-inlet pipe communicating with the discharge-pipe and submerged in the water contained by the cavity, substantially as set forth.

4. The combination with two or more divisions of a steam-circulating and water-gathering system containing a reservoir for the reception of the water of condensation, of passages giving communication between the steam-space of each division and the reservoir and a water seal in each of said passages independent of each other but subject to the pressure of the reservoir.

5. The combination with a division of a divided steam-circulating and water-gathering system containing a reservoir for the reception of the water of condensation, of a division-check comprising a vessel having an overflow-outlet and subject to pressure from the reservoir, an inner chamber open at its lower part to the general interior of the vessel and divided in its upper part into two compartments which communicate with each other beneath the partition which divides them, a pipe leading from the steam-space of the division into one of the compartments of said inner chamber and a pipe leading from the other of said compartments into the reservoir.

6. The division-seal essentially as described for connection in a divisional steam-heating system, said seal comprising a vessel provided with an overflow-outlet near the top, an open-bottomed cup depending from the top plate and divided from its top to a point below the outlet and an opening through the top plate into each compartment of the cup.

7. In combination with a horizontal return-pipe of a steam-heating system and a plurality of drip-pipes leading into said return, a horizontal air-pipe connected with the steam-space of said drip-pipes by means preventing entrance of water into said air-pipe, a vertical prolongation of said air-pipe also connected into the horizontal return-pipe and a vertical pipe connected at both ends with the vertical prolongation of the air-pipe and provided with an air-valve.

8. The combination with a steam-heater and a steam-supply pipe leading thereto, and a water-discharge pipe leading therefrom, of a water-seal fitting connected at two opposite points to the steam-supply pipe so as to permit the steam to flow through the fitting, a cavity located within the shell of the fitting to receive water of condensation, and discharging such water into the steam-supply, and also flared upwardly and outwardly to prevent rupture by freezing, and an inlet-tube for water connected to the water-discharge pipe and having its discharge end constricted in diameter and beveled marginally and also submerged in the water within the cavity, substantially as set forth.

9. The combination with a steam-heater, a steam-supply pipe leading thereto, and a water-discharge pipe leading therefrom, of a water-seal fitting connected at opposite points to the steam-supply pipe so as to permit the steam to flow through the fitting, a plurality of open cavities located within the fitting and receiving water of condensation and discharging the water into the steam-supply pipe, and a plurality of water-inlets each connected to a water-discharge and submerged in the water in the corresponding cavity; each of the cavities being flared upwardly and outwardly to prevent rupture by freezing, substantially as set forth.

10. In a steam-heating system the combination with a steam-distributing pipe, a plurality of heating devices, and the distributing branch pipes leading from the distributing-pipe to the heating devices, of individual seal-fittings for said heating devices which are in open communication with said distributing-pipe, each constructed to retain therein a body of water of condensation from the steam, and water-discharge pipes operating under pressures independent of the branch pipes and leading from the heating devices to said seal-fittings, the lower ends of said water-discharge pipes being made of smaller cross-sectional area than the fittings and extending sufficiently below the water-lines of said fittings to prevent the passage of gaseous fluids either into or from the pipe while permitting free flow of water from the heating devices to the fittings and from thence to the steam-distributing pipe the seal-fitting of each heating device being located a distance below the water-outlet of said heating device at least as great, expressed in feet of water, as the difference between the pressures in the distributing-pipe and heating device.

11. In a steam-heating system the combination with a steam-distributing pipe and a plurality of heating devices receiving steam from said pipe, of a plurality of individual seal-fittings for said heating devices, each located a substantial distance below the water-outlet of its heating device and water-discharge pipes for conducting the water of condensation from said heating devices to said seal-fittings, said fittings being constructed to maintain therein a body of water of condensation in which the terminal ends of the water-discharge pipes are submerged, and the pressure of the steam on the steam side of the several fittings being equal while the pressures in the water-discharge pipes leading from the heating devices to the seal-fittings varies in accordance with the variation of steam consumption in the heating devices.

12. In the pipes of a steam-distributing and water-gathering system forming part of a steam-heating system, a water-seal fitting in open communication with the steam-space of said pipes, a branch steam-pipe leading from said space and conveying steam therefrom to a point of steam consumption, as a steam-heating device or devices, located at a level substantially higher than said fitting, and a water-discharge pipe leading from said point of steam consumption to said fitting, the terminal end of which is of less cross-sectional area than that of the fitting and which is sealed by the water in said fitting, whereby the water of condensation passes freely from said water-pipe into and out of said fitting, while gaseous fluids are prevented from passing from said water-pipe to the fitting and vice versa.

13. In the pipes of a steam-distributing and water-gathering system forming part of a steam-heating system, a water-seal fitting in open communication with the steam-space of said pipe and discharging water into said steam-space, a branch steam-pipe external to the fitting leading from said steam-space and conveying steam therefrom to a point of consumption, as a steam-heating device or devices, located at a level substantially higher than said fitting, and a water-discharge pipe leading from the point of steam consumption to said fitting and having its terminal end sealed by the water in said fitting, whereby the water of condensation passes freely from said water-discharge pipe into and out of the fitting, while gaseous fluids are prevented from passing from said water-pipe to the fitting and vice versa.

14. In the pipes of a steam-distributing and water-gathering system forming part of a steam-heating system, a water-seal fitting in open communication with the steam-space of said pipe, a pipe leading from said fitting and external thereto for conveying steam therefrom to a point of consumption, as a steam-heating device or devices, located at a level substantially higher than said fitting, and a water-discharge pipe leading from the point of steam consumption to said fitting and having its terminal end sealed by the water in said fitting, whereby the water of condensation passes freely from said water-pipe into and out of said fitting while gaseous fluids are prevented from passing from said water-pipe to the fitting and vice versa.

15. In a steam-circulating and water-gathering system, the combination with a steam-heating device, a steam-pipe leading thereto, and a water-discharge pipe leading therefrom, of a water-seal fitting connected with the discharge-pipe and with the steam-supply pipe, and having an open cavity containing water of condensation in which the terminal end of the water-discharge pipe is submerged and by which it is sealed, said seal-fitting affording a water-column external to the fitting for counterbalancing the differences of pressure between the interior of the heating device and the interior of the steam-supply pipe.

16. The combination with a steam-supply pipe a steam-circulating system, of a heating device connected with said supply-pipe and having a water-discharge pipe which is independent of the supply-pipe and which is connected with the steam-space of said supply-pipe through a water seal located a substantial distance below the level of the water-outlet of the heating device which is subject on one side to the pressure of the circulating-pipe and on its other side to the pressure of the heating device.

17. In a steam-heating system, a closed sealed circuit independent of the boiler, except as a source of steam-supply, a heating device, a branch supply-pipe directing steam from said closed circuit to said heating device, pipes for discharging the condensed water from said heating device to said circuit, said steam-supply and water-return pipes being in open communication with each other through a water-seal fitting located a substantial distance below the water-outlet of the heating device, whereby the seal, while permitting water to pass through it in either direction, prevents the passage in either direction of gaseous fluids.

18. In a steam-heating system, the combination with a heating device receiving steam from the steam-space of the system, a water-discharge pipe, a seal-fitting in open communication with the steam-space of the system into which said water-pipe discharges and the terminal end of which is submerged by the water in said seal-fitting, said seal-fitting being located a distance below the water-outlet of the heating device, at least as great, expressed in feet of water, as the difference between the pressures in the feed side of the steam-space and in the heating device.

In testimony that I claim the foregoing as my invention I affix my signature, in presence of two witnesses, this 16th day of August, A. D. 1898.

EUGENE F. OSBORNE.

Witnesses:
WILLIAM L. HALL,
CHARLES W. HILLS.